United States Patent

[11] 3,631,659

[72] Inventor  Alexandre Horowitz
              Eindhoven, Netherlands
[21] Appl. No. 46,139
[22] Filed     June 15, 1970
[45] Patented  Jan. 4, 1972
[73] Assignee  U.S. Philips Corporation
              New York, N.Y.
[32] Priority  June 18, 1969
[33]          Netherlands
[31]          6909256

[54] LAWN MOWER
     8 Claims, 3 Drawing Figs.
[52] U.S. Cl..................................... 56/11.9,
                              136/173, 180/68.5
[51] Int. Cl..................................... A01d 53/00

[50] Field of Search............................................ 56/11.9,
                              10.5, 17.5; 180/20, 68.5; 136/173

[56]              References Cited
              UNITED STATES PATENTS
     3,271,939  9/1966  Granger, Jr. et al. ......... 56/11.9

Primary Examiner—Louis G. Mancene
Assistant Examiner—J. A. Oliff
Attorney—Frank R. Trifari ABSTRACT: A lawnmower which is driven by a battery-fed electric motor, a pair of side frames carries the cutters and a roller adapted to roll over the lawn to be mowed. The batteries are accommodated in the roller which is in the form of a hollow cylinder.

PATENTED JAN 4 1972

3,631,659

INVENTOR.
ALEXANDRE HOROWITZ
BY
*Frank R. Trifari*
AGENT

LAWN MOWER

ABSTRACT OF THE DISCLOSURE

A lawnmower which is driven by a battery-fed electric motor, a pair of side frames carries the cutters and a roller adapted to roll over the lawn to be mowed. The batteries are accommodated in the roller which is in the form of a hollow cylinder.

The invention relates to a cylinder cutting, motor-powered lawnmower driven by a battery-fed electric motor. The lawnmower is provided with a travelling frame which carries the cutters and a roller arranged to roll over the lawn to be mowed and is rotatably mounted on a nonrotatable axle which is supported in the frame in a substantially horizontal direction.

A problem in lawnmowers of this type is the placement of the batteries, which are usually arranged above the cutting cylinder.

Such an arrangement not only requires special precautions to protect the batteries against dirt and weather, but also requires an extension of the frame, because there is a need for additional room.

It is an object of the present invention to eliminate the said disadvantages and to simplify the construction of the mower.

According to the invention, a mower of the aforesaid type is characterized in that the batteries are accommodated in the roller which is in the form of a hollow cylinder.

The cylindrical roller protects the batteries against dirt and weather and such a placement does not require additional room. Another advantage is that the weight of the batteries is used to increase the weight of the roller whose function is to level the lawn after the mowing operation.

A preferred embodiment is characterized in that the batteries, in the form of a rechargeable accumulator, are accommodated in a holder of substantially U-shaped section, the sidewalls of which "facing the roller ends" are provided with short spindles for carrying the holder. The holder-supporting axle is formed by the short spindles and usually coincide with the axle about which the roller is rotatable.

In an advantageous embodiment in which rechargeable batteries are used, the accessories required for the charging operation, such as a charging resistor and a rectifier, are also accommodated in the roller.

The invention will now be described more fully with reference to an embodiment shown schematically in the drawing, from which description further advantageous details will become apparent. Parts not necessary for a complete understanding of the invention have been omitted from the drawing.

Figure 1:
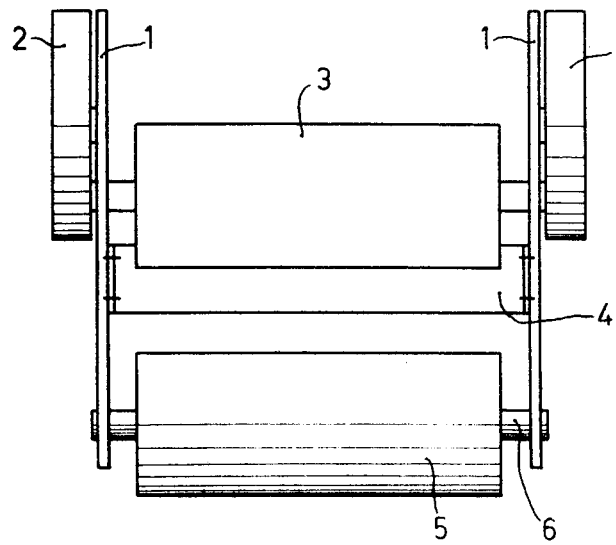
FIG. 1 is a top plan view of a lawnmower according to the invention.

The lawnmower according to the invention is powered by a motor not shown in the drawing. The mower further includes a travelling frame 1 provided with wheels 2 which may or may not be driven.

The frame 1 carries inter alia a cutting cylinder 3 driven by the motor, a counterblade 4 and a roller 5.

The roller 5 is arranged for rotation about a nonrotatable axle 6 which is supported in the frame 1 and extends in a substantially horizontal direction.

The roller 5, which is in the form of a hollow cylinder, accommodates batteries which feed the motor. The batteries are in the form of a rechargeable accumulator 7. The accumulator 7 is accommodated in a holder 8 of substantially U-shaped section the sidewalls of which facing the roller ends 9 and 10 are provided with short spindles 11 and 12 which support the holder 8. The axle supporting the holder 8, which is constituted by the short spindles 11 and 12, coincides with the axle 6 about which the roller 5 is rotatable. Accessories 13 required for charging the accumulator 7, such as a charging resistor and a rectifier, are also accommodated within the hollow cylinder.

The hollow short spindles 11 and 12 serve as conduits for wires (not shown) by which the accumulator 7 is connected to the motor and, through the accessories 13, to a charging supply source.

A removable cover 14 is provided in part of the cylindrical wall of the roller 5. The cover 14 closes an opening through which the accumulator 7 can be introduced into, and removed from, the holder 8.

Figure 2:
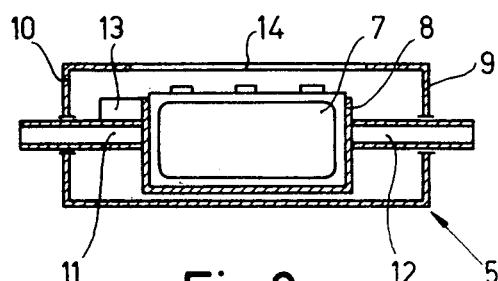
FIG. 2 is a vertical cross-sectional view through a component part, namely the "running roller.
Figure 3:
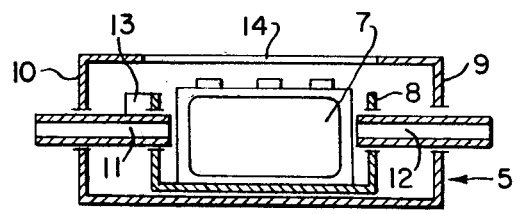
" and FIG. 3 is another view of the running roller showing a different embodiment thereof.

In the embodiment shown in FIG. 2, the short spindles 11 and 12 are rigidly secured to the holder 8, so that the position of the accumulator 7 relative to the lawn to be mowed is fixed. However, an embodiment in which the holder 8 is arranged so as to be capable of rocking about the short spindles 11 and 12, so that owing to the force of gravity the accumulator 7 will substantially remain in the position shown in FIG. 2, is also covered by the invention, and shown in FIG. 3.

Obviously, the invention is not restricted to the aforedescribed embodiment. Especially when dry batteries are used, several methods of accommodating the batteries in the roller are possible such as, for example, accommodating them in a pinion the shaft of which coincides with the axle about which the roller is rotatable.

What is claimed is:

1. A battery-powered electric lawnmower comprising a pair of traveling side frames, a plurality of cutters mounted between said side frames, a nonrotatable axle mounted between said side frames being substantially horizontal with respect to the surface over which the mower travels, a hollow cylindrical roller rotatably mounted on said axle for rolling over and smoothing the lawn being mowed, and support means mounted within said hollow cylindrical roller for supporting batteries therein.

2. The battery-powered lawnmower according to claim 1 wherein said support means comprises a holder having a substantially U-shaped cross section, the sides of said holder being parallel to the end faces of said cylindrical roller, and a short spindle attached to each of said sides of said holder for mounting said holder within said cylindrical roller.

3. The battery-powered lawnmower according to claim 2 wherein said short spindles form said axle.

4. The battery-powered lawnmower according to claim 3 further comprising means for charging the batteries mounted within said hollow cylindrical roller.

5. The battery-powered lawnmower according to claim 4 wherein at least one of said spindles is hollow so that wires which connect the batteries to the charging means and to a means for driving the lawnmower may pass therethrough.

6. The battery-powered lawnmower according to claim 5 further comprising a removable cover mounted on the cylindrical wall of said roller for covering an opening therethrough which allows insertion and removal of the batteries therefrom.

7. The battery-powered lawnmower according to claim 6 wherein said spindles are rigidly secured to the holder.

8. The battery-powered lawn mower according to claim 6 wherein said holder is rotatably mounted on said spindles for rocking movement thereabout.

* * * * *